TIME AND EVENTS RECORDER

Original Filed Nov. 29, 1957

INVENTORS
JAMES M. McCULLEY
JAMES KIRALY &
JOHN B. HARRISON
BY G. D. O'Brien
Q. Baxter Warner
ATTORNEYS 2,950,159

TIME AND EVENTS RECORDER

James M. McCulley, Mount Laurel Township, James Kiraly, Riverside, and John B. Harrison, Riverton, N.J., assignors, by mesne assignments, to the United States of America as represented by the Secretary of the Navy Original application Nov. 29, 1957, Ser. No. 699,877. Divided and this application Jan. 29, 1959, Ser. No. 794,217

3 Claims. (Cl. 346—59)

Figure 1:
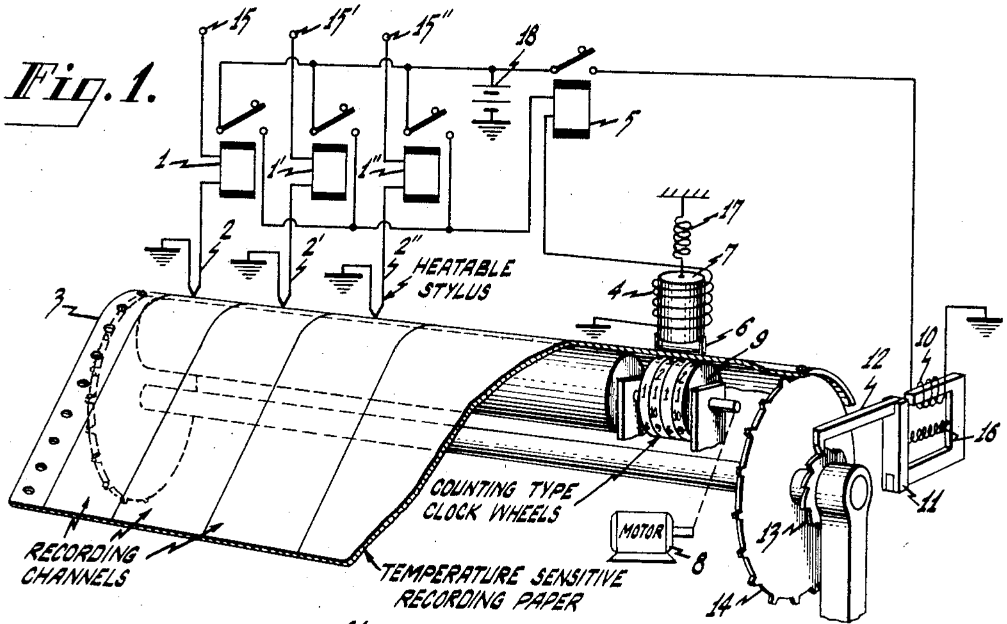

This invention relates to improved apparatus for recording a number of events and their time of recording.

The present application is a division of copending application Serial No. 699,877, filed November 29, 1957, and now abandoned, which discloses the same subject matter as the present application.

Multiple input recorders usually either use a spatial dimension to record the time of an event, or record the time at set, predetermined intervals which have no relation to the time of all of the events recorded.

In order to monitor a missile guidance system and conduct training exercises for its personnel, a device is needed which records many different types of events and their time of occurrence efficiently and accurately. Such events furnish binary data at unpredictable and widely-separated intervals of time. Since the binary data to be recorded is unevenly distributed throughout long periods of time, the dimension of time cannot be visually recorded as spatial dimension efficiently; and, for the required accuracy, the recording of the time must be synchronized with the recording of the events themselves.

A general object of this invention is to devise an improved time and events recorder.

A further object is to provide more efficiently for the recording of a multiplicity of events whether singly or in groups and the time of occurrence of each event or group of events.

Another object is to provide such an improved recorder which will record the times of occurrence more accurately than was heretofore known.

A still further object is to provide such an improved recorder with such accuracy in recording time which will record events with more efficient use of the record than was heretofore known by advancing the record only when an input or group of inputs has been or will be recorded.

The foregoing objects can be accomplished in accordance with the invention by an improved recorder capable of automatically recording from a plurality of binary data input signal sources in a plurality of separate recording channels. The invention also records the time of recording of the input signal by using any data input signal or group of different types of data input signals, directly or indirectly, to activate a time printing mechanism and, either before or after a suitable delay, to advance the record a discrete step or a selected amount by activating an intermittent record advance mechanism.

The recording of each of the different types of inputs is handled by a separate electrical circuit which actuates separate recorders on the separate channels of the record as the record moves past the data recorders. This recording may be accomplished by printing in ink or punching holes on a record of ordinary paper, or by using a heated stylus on temperature-sensitive paper. The latter method is used in the preferred embodiment of the invention.

In one preferred embodiment of the invention, the relays used to control the operation of the recorder provide the sequencing timing by the inherent delay in their operation. Thus, the time is recorded a constant interval of time after the recording of the data.

In the second preferred embodiment of the invention, the sequencing timing is provided by cams driven by a synchronous motor. Thus, the time is recorded a variable interval of time after the recording of the data.

Figure 2:
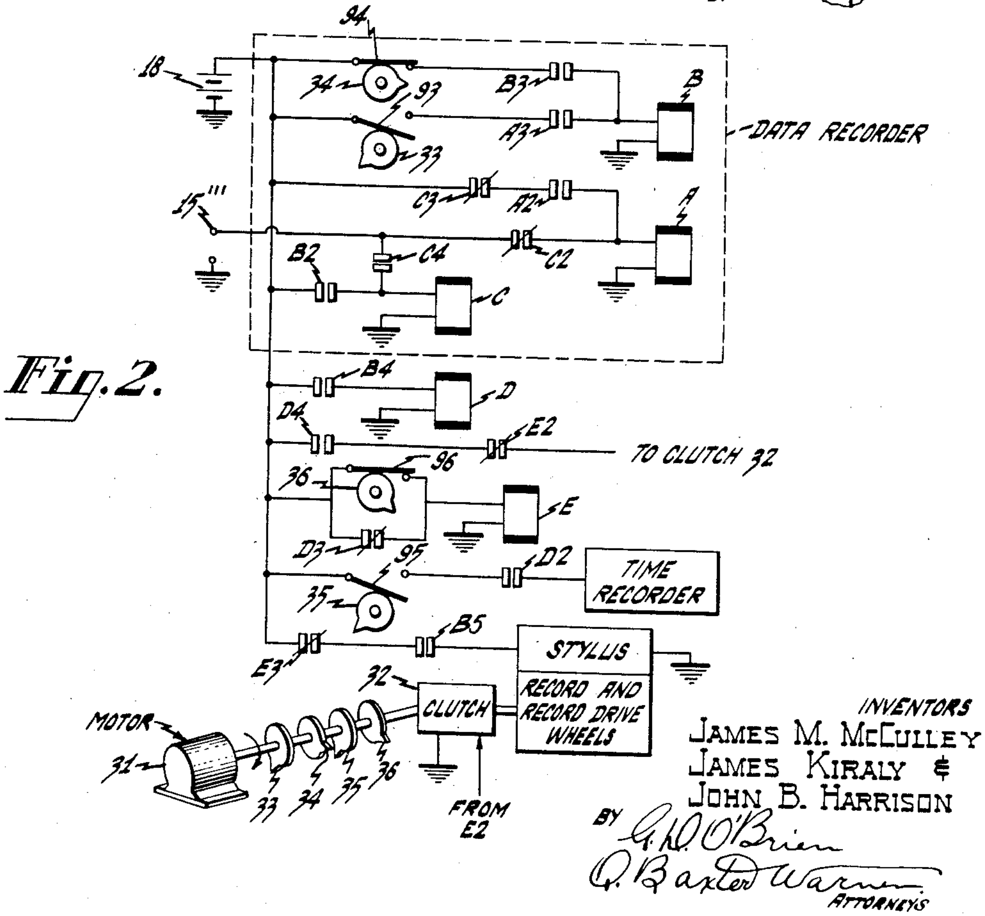

Other objects and many of the attendant advantages of this invention will be readily appreciated as the same becomes better understood by reference to the following detailed description when considered in connection with the accompanying drawing wherein:

Filg. 1 is a partially schematic, perspective view of a preferred embodiment; and Fig. 2 illustrates schematically a second embodiment.

The general assembly of the time and events recorder in the embodiment illustrated in Fig. 1 includes a multiplicity of event recording mechanisms, a time recording mechanism, and a record advance mechanism. Although only three event recorders are shown, any desired number of them may be employed. Each event recorder consists, for example, of a relay 1, and a stylus 2 which may be heated electrically by a data input pulse.

The record 3 may comprise, for example, a movable strip of temperature-sensitive paper, on which the styli 2, which consist of a single loop of resistive wire, which will heat when an electrical signal is applied to it, ride continuously. This paper is marked visibly by a heated stylus, but is not marked by an unheated one.

A possible construction of such paper includes aluminum backing, a coating of carbon on the aluminum, and a film of titanium oxide or lead disulphate over the carbon. Wherever such paper is touched by a hot stylus, the film of titanium oxide will be burned away, and the coating of carbon will show. Thus a permanent visible record will be left of all stylus excitations.

The time printing mechanism consists of an electromagnet coil 4, an inertia time delay relay 5, a spring-biased printing hammer 7 operated by the coil, an ink ribbon 6 covering the printing end of hammer 7, counting type clock wheels 9, placed at a point opposite the printing hammer 7, and a constant speed clock motor 8, which drives the clock wheels. The ink ribbon 6 will print on the record only in those places where the record is backed by the clock wheels 9. Thus, the number registered on the clock wheels is printed when the printing hammer strikes the record.

The record advance mechanism consists of an electromagnet coil 10 and a spring-biased armature 11 operating as in the time recording mechanism, a pawl 12 attached to the armature, and a ratchet wheel 13 and a pair of sprocketed record driving wheels 14 all on the same axis. In this case, the armature movement operates the pawl 12, which in turn drives the ratchet wheel 13 and the pair of record driving wheels 14, and causes the record 3 to advance one discrete step.

The binary data input signals to be recorded from separate channels are received at the several input terminals 15, 15′, 15″. Each different type of data input signal is received at a different input terminal, and activates a different event recorder relay 1, 1′, 1″ and heats a different event recorder stylus 2, 2′, 2″. These styli are so placed that each makes its mark on a different channel of the record 3. Thus, the different types of data input signals may be distinguished by their position on the record.

When one of the data recorder relays 1, 1′, 1″ is activated by a data input signal, the relay closes, making an electrical circuit which activates coil 4 of the time recording mechanism. Since all of the contact pairs of the relays 1, 1', 1'' of the event recorders are in parallel, if any one of them is activated, the coil 4 of the time recording mechanism is energized. Also, if more than one is activated, more than one event recorder makes a mark upon the record, but the time recording mechanism operates in the same manner as before. Thus, this recorder may record events singly or in groups. When the coil 4 of the time printing mechanism is energized by one or more event recorder relays, the printing hammer 7 is attracted by the coil and forced against the record, causing the printing of the numbers recorded on the counting type time wheels 9.

Any signal which energizes the coil 4 also closes the time delay relay 5 of the time recording mechanism, making an electrical circuit which energizes the coil 10 of the record advance mechanism. However, there is an interval of time between the energizing of the two coils due to the lag time of the relay operation. The armature 11 and the pawl 12 of the record advance mechanism are attracted, driving the ratchet wheel 13, and thus advancing the record 3 one discrete step.

When the data input pulse ceases to energizes the relay 1 of the event recorder of its channel, the relay opens, de-energizing the electromagnet coil 4 of the time recording mechanism. The hammer 7 of that mechanism is spring-biased to its normal position. The relay 5 of the time recording mechanism also opens, de-energizing the electromagnet coil 10 of the record advance mechanism; and the pawl 12 is spring-biased by compression spring 16 to its normal position without driving the ratchet wheel 13, or the record 3, backwards.

The time delay in the operation of the relays is used to provide that the time printing mechanism and the record advance mechanism do not operate simultaneously, but sequentially.

The second embodiment of the invention is illustrated in Fig. 2. The parts of the first embodiment which are used unchanged in this second embodiment are the recording styli, the time recording mechanism, the record, and the record driving wheels. These parts are not shown in detail in Fig. 2, but their positions are indicated by blocks in the schematic diagram. To these parts of the first embodiment, new means for controlling and remembering the data input signals and for driving the record driving wheels have been added.

In Fig. 2, for the sake of clarity, relay contacts are schematically shown connected in the circuits to be controlled rather than adjacent to the respective actuating coils. However, the coil and the contacts which are parts of the same relay all have the same identifying letter. The normally closed contacts are shown with a line crossed through the pair of contacts. The normally open contacts have no such line.

The new means for driving the record driving wheels include a synchronous motor 31 and a magnetic clutch 32. The clutch is operated by signals from the control means. Upon receipt of these signals it engages and disengages the motor, which operates continuously, but will drive the record only when the clutch is engaged.

The control and memory means in the second embodiment consist of three relays A, B, C per recording channel and their respective contacts, two other relays D, E which control the operation of the clutch and the time recording mechanisms, and four cams 33, 34, 35, 36 operated continuously by the synchronous motor 31, which operate respectively switches 93, 94, 95, 96. They are indicated both in the motor circuit and in the data recorder circuit. Only one data recorder circuit is shown in Fig. 2, although, as in the first embodiment, any number of them may be employed.

A data input signal to be recorded is received at input terminal 15'''. It passes through normally closed contact C2 of relay C and energizes relay A, operating contacts A2 and A3. Normally open contact A2 closes, making an electrical circuit from battery 18 through contacts A2 and C3 holding relay A energized.

At some time during the cycle of the synchronous motor 31, the transfer switch 93 is closed for 20 milliseconds by its cam 33. If relay A is closed, relay B is energized through contact A3 operating contacts B2, B3, B4, and B5 at that time. If relay A has not been closed by an input pulse, contact A3 is in its normally open position and relay B is not energized, and no action takes place in the recorder due to the closing of switch 93.

If relay B is energized, contact B3 is closed. This makes a circuit through contact B3 which holds relay B energized as long as normally closed cancel switch 94 is not opened by its cam 34. The closing of relay B also makes an electrical circuit through contact B2 which energizes relay C, which is held closed as long as relay B is closed, which is until cancel switch 94 is opened, operating contacts C2, C3 and C4.

When relay C closes, relay A is de-energized by the opening of normally closed contacts C2 and C3. These contacts disconnect all possible sources of excitation voltage to relay A. It de-energizes, opening contacts A2 and A3, but causing no further changes.

If relay B, or any of its analogous counterparts in data recorders in other channels is closed, relay D is activated by an electrical circuit through contact B4, operating contacts D2, D3 and D4. It is held closed as long as relay B is held closed. If relay D is closed when the print switch 95 is closed, the time recording mechanism will be activated through contact D2 and print switch 95. Print switch 95 is closed for 20 milliseconds by cam 35 after transfer switch 93 has been operated by cam 33, but before cancel switch 94 has been opened by cam 34.

If relay D is activated normally closed contact D3 is open. As long as normally closed clutch switch 96 is unopened by cam 36, relay E will remain energized. However if relay D is energized and switch 96 is opened by cam 36, normally energized relay E is de-energized, operating contacts E2 and E3. This occurs after print switch 95 has been operated by cam 35, but before cancel switch 94 has been opened by cam 34.

The opening of relay E closes normally closed contact E2. Normally open contact D4 has been closed by the energizing of relay D. Thus, the clutch is energized through contacts E2 and D4, which drives the record far enough that the recordings of time printing do not overlap. If no event had occurred relay D would not be energized, opening of switch 96 would not de-energize relay E and there would be no advance of the record.

The de-energizing of relay E also causes the closing of normally closed contact E3. This feeds a voltage to all the styli connections of the data recorders. If relay B has been closed due to an input signal, or if any of its analogous counterparts in data recorders in other channels has been closed due to a different type of input, contact B5 or its counterpart is closed. Thus, an excitation of voltage from voltage source 18 is applied to the styli of those channels which have detected an input signal when relay E opens. This records a long mark on the record, because relay E is open only when the record is being advanced.

When clutch switch 96 closes again, relay E is re-energized. Contact E3 opens making voltage no longer available to the styli connections of the data recorders. Contact E2 opens de-energizing the clutch, which disengages the motor from the record drive wheels.

The cancel switch 94 is then opened by cam 34 for 20 milliseconds. This breaks the electrical circuit holding relay B energized, and it opens, opening contact B2, which breaks the electrical circuit holding relay C energized. Contact B4 opens, breaking the electrical circuit holding relay D energized. At this point all the components of the system have returned to the condition they had at the beginning of this discussion.

There are two other problems which this system of relays solves. One is that of remembering a signal which is received too late in the cycle to be recorded.

If an input signal is received after the operation of the transfer switch 93, it will activate relay A as shown before, causing it to hold itself on. However, relays B and C are not affected by this change during the rest of that cycle. Also, the cancel switch 94 does not affect relay A. During the following cycle, relay B is energized when the transfer switch 93 closes, and the recording takes place as described above. Thus, the input signal has been remembered.

The other problem to be solved is that of an input signal which continues for more than one cycle. If an input signal continues after the cancel switch 94 has de-energized relay B, relay C continues to be energized by the input pulse through contact C4 and is held in this state as long as the input signal is received at the input terminals. Contact C2 is thus held open which disconnects the input terminal from relay A. Thus, another recording may not begin, until that input pulse has ceased and another has begun.

Obviously many modifications and variations of the present invention are possible in the light of the above teachings. It is therefore to be understood that within the scope of the appended claims the invention may be practiced otherwise than as specifically described.

What is claimed is:

1. A recording device for producing a visible record of groups of data input signals, said groups varying in data content from one to a multiplicity of data input signals, each of said groups being in a separate channel, said device comprising data recording means for each channel responsive to data input signals from its channel; time recording means for producing a visible record of the time of recording of a data group in response to each of said groups of data input signals; record advancing means for intermittently advancing said record a discrete step; and controlling means for said recording device to remember data input signals which occur during the processing cycle of a previously received data input signal; said controlling means comprising, a recurrent timing means defining a processing cycle; a signal storing relay for temporarily storing input signals from a selected channel; a transfer relay for receiving a data input signal from said storing relay at a predetermined first time during the processing cycle selected by said timing means; and at least two sets of contacts on said transfer relay to successively energize in conjunction with said timing means first said time recording means and then said data recording means and said record advancing means.

2. The apparatus as recited in claim 1 having an additional relay operated by contacts on said transfer relay, said additional relay having normally closed contacts in series with said storing relay to prevent the processing of an additional data signal whereby the double recording of data signals is prevented.

3. A time and event recorder for recording data received over a multiplicity of channels comprising: a corresponding multiplicity of data recorders, a temperature sensitive record, a single time recorder, a single record advance mechanism, and memory means; each said data recorder comprising: a first relay responsive to data input signals from its channel, a second relay activated by said first relay, said second relay comprising two sets of fixed and movable contacts, a third relay controlled by one pair of contacts on said second relay, said third relay de-energizing said first relay, and a stylus in contact with said record and capable of being heated, the heating of said stylus being controlled by said second relay; said time recording mechanism comprising: an electromagnet, a relay which activates said electromagnet, a spring-biased hammer activated by said electromagnet, counting type clock wheels, and a constant speed motor for driving said clock wheels, said clock wheels being disposed to back said record opposite said printing hammer, and where said relay of said time recorder is activated by any of said second relays of said data recorders; a record advance mechanism comprising: said constant speed motor, a relay responsive to said relay of said time recorder, a clutch attached to the shaft of said motor and responsive to coincident control of both said relay of said time recorder and said relay of said record advance mechanism, and record driving wheels which drive said record and are driven by said motor when said clutch is engaged; said memory means comprising: said second set of contacts on each second relay of said data recorder which hold that relay energized; a transfer switch, a cam operating said switch and driven by said motor, said switch being in a series circuit to energize said second relay of said data recorder; a print switch, a cam operating said switch and driven by said motor, said switch being in series with said electromagnet of said time recorder; a start clutch switch, a cam operating said switch and driven by said motor, the operation of said switch causing the operation of said clutch; a holding circuit for said second relay; a normally closed cancel switch, a cam operating said cancel switch and driven by said motor, said switch being in series with the holding circuit of said second relay of said data recorder; said cams being disposed relative to one another such that they actuate said switches in sequence as follows: said transfer switch, said print switch, said start clutch switch, and said cancel switch.

References Cited in the file of this patent

UNITED STATES PATENTS

| | | |
|---|---|---|
| 1,306,631 | Rogers | June 10, 1919 |
| 1,315,201 | Bauer | Sept. 9, 1919 |

FOREIGN PATENTS

| | | |
|---|---|---|
| 866,254 | Germany | Feb. 9, 1953 |